United States Patent
Crooymans et al.

(10) Patent No.: US 12,096,715 B2
(45) Date of Patent: Sep. 24, 2024

(54) SINGULATING METER

(71) Applicant: Bourgault Industries Ltd., St. Brieux (CA)

(72) Inventors: Brennan Crooymans, St. Brieux (CA); Scot Jagow, St. Brieux (CA); Glenn Hantke, St. Brieux (CA)

(73) Assignee: Bourgault Industries Ltd., St Brieux (CA)

( * ) Notice: Subject to any disclaimer, the term of this patent is extended or adjusted under 35 U.S.C. 154(b) by 0 days.

(21) Appl. No.: 17/987,464

(22) Filed: Nov. 15, 2022

(65) Prior Publication Data
US 2023/0073423 A1  Mar. 9, 2023

Related U.S. Application Data

(62) Division of application No. 16/843,394, filed on Apr. 8, 2020, now Pat. No. 11,547,037.

(30) Foreign Application Priority Data

Apr. 23, 2019 (CA) ...................... 3040955

(51) Int. Cl.
*A01C 7/04* (2006.01)
*A01C 5/06* (2006.01)
(Continued)

(52) U.S. Cl.
CPC .............. *A01C 7/046* (2013.01); *A01C 5/064* (2013.01); *A01C 7/102* (2013.01); *A01C 7/205* (2013.01); *A01C 7/206* (2013.01)

(58) Field of Classification Search
CPC ......... A01C 7/046; A01C 5/064; A01C 7/102; A01C 7/205; A01C 7/206; A01C 7/044;
(Continued)

(56) References Cited

U.S. PATENT DOCUMENTS 7,699,009 B2   4/2010   Sauder et al.
8,789,483 B2   7/2014   Gilstring
(Continued)

OTHER PUBLICATIONS

Youtube video about Vision, "www.youtube.com,"https://www.youtube.com/watch?v=4XyXG5B-X0I. (1:44 minute YouTube video), access on Jan. 25, 2023.
(Continued)

*Primary Examiner* — Christopher J. Novosad
(74) *Attorney, Agent, or Firm* — Frost Brown Todd LLP

(57) ABSTRACT

A singulating meter includes a seed disc with seed apertures rotates in a vertical plane through a seed reservoir. A horizontal seed tube has an inlet adjacent to the top of the seed disc and the seed apertures move along a seed aperture path toward the inlet. Pressurized air flows into the tube inlet, and through each seed aperture as it rotates upward out of the seed reservoir pushing a seed into each seed aperture which seed then moves along the seed aperture path through about 180 degrees of rotation to a release position at the top of the path where the seed is carried horizontally into the seed tube. An ejector pushes debris out of the seed apertures into the seed tube. An alignment guide moves the singulator element of the meter into the operating position where same is magnetically secured.

15 Claims, 14 Drawing Sheets

(51) Int. Cl.
*A01C 7/10* (2006.01)
*A01C 7/20* (2006.01)

(58) Field of Classification Search
CPC .. A01C 7/042; A01C 7/04; A01C 7/00; A01C 5/06; A01C 5/00; A01C 7/10; A01C 7/08; A01C 7/201; A01C 7/20
See application file for complete search history.

(56) References Cited

U.S. PATENT DOCUMENTS

| | | | |
|---|---|---|---|
| 2014/0109813 A1* | 4/2014 | Wilhelmi | A01C 7/125 111/185 |
| 2016/0128272 A1* | 5/2016 | Sauder | A01C 7/084 111/183 |
| 2017/0311536 A1 | 11/2017 | Sauder | |

OTHER PUBLICATIONS

U.S. Pat. No. 11,547,037, Issued on Jan. 10, 2023.

\* cited by examiner

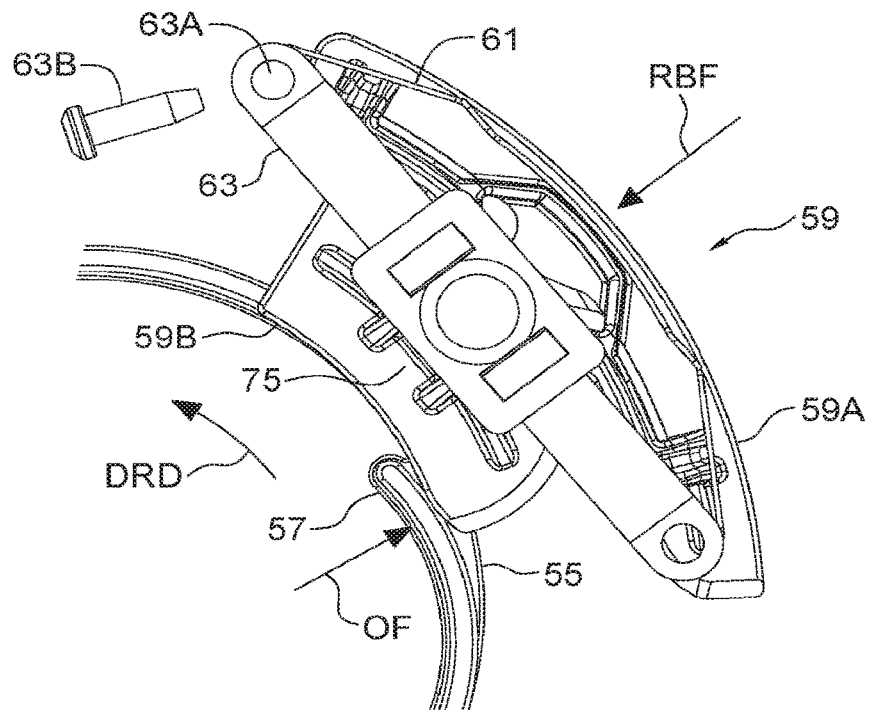
FIG. 18
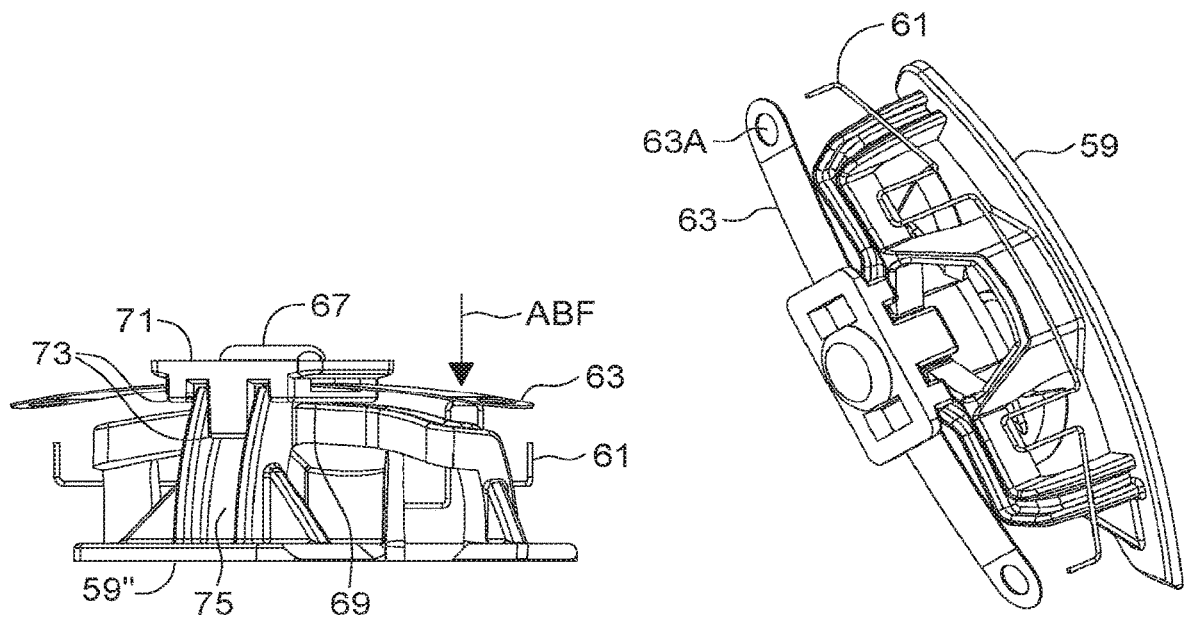
FIG. 19
FIG. 20

SINGULATING METER

This application is a continuation application which claims priority to, and benefit of U.S. application Ser. No. 16/843,394, filed Apr. 8, 2020, published as U.S. Pub. No. 2020/0337220, entitled "Singulating Meter," which claims priority to, and benefit of CA Application No. 3040955, filed on Apr. 23, 2019, the contents of each are herein incorporated by reference in their entirety.

This disclosure relates to the field of agricultural seeding implements and in particular a singulating meter for dispensing seeds into a furrow.

BACKGROUND

When seeding crops such as corn it is desirable to plant the corn seeds in a furrow at a pre-determined equal distance from each other. To achieve this equal spacing singulating meters have been developed which dispense seeds one at a time from a hopper full of seeds to a furrow opener. One typical type of singulating meter includes a seed disc rotating in a substantially vertical plane in a housing, and a seed reservoir at the bottom of the housing on a seed side of the disc. Seed apertures are spaced radially around the disc and a bottom portion of the disc rotates along the seed reservoir. A pressure differential between the seed side of the disc and the opposite vacant side of the disc causes individual seeds to be captured in the seed apertures and carried to a release position where the pressure differential is neutralized and the seeds drop into a seed tube for delivery to a furrow opener.

Such singulating meters are disclosed for example in U.S. Pat. No. 7,699,009 to Sauder and United States Published Patent Application No. 2017/0311536 of Sauder. In the Sauder vacuum type meters, a partial vacuum is created on the vacant side of the disc opposite the seed reservoir to hold the seeds in the seed apertures. In contrast, U.S. Pat. No. 8,789,483 to Gilstring discloses a pressurized type of singulating meter where a positive pressure on the seed side of the disc pushes the seeds into the seed apertures.

Both the Sauder and Gilstring meters pick up seeds from a reservoir that extends from about 4:00 o'clock to 8:00 o'clock on the rotating disc and then carry the seeds in the seed apertures to a position about 3:00 o'clock where the pressure differential is neutralized and the seeds drop vertically into the seed tube. To remove any debris or seeds that might be stuck in the apertures after the seed drops, typically a debris ejector is arranged to poke through the seed apertures from the vacant side of the seed disc toward the seed side of the seed disc after the seed drops to remove any debris or seeds that might be stuck in the apertures.

In the vacuum type meter of the Sauder application '536 the pressure differential is neutralized by providing a vacuum chamber sealed to the face of the vacant side of the disc from about the 6:00 o'clock position through about 270 degrees to the 3:00 o'clock position. When the disc rotates a seed aperture past the seal at the 3:00 position the seed drops out of the aperture. The debris ejector is then located in the gap between 3:00 and 6:00 o'clock and the debris pushed out also falls into the seed tube.

In contrast it can be seen in the pressurized type meter of Gilstring substantially the whole of the seed side of the disc is pressurized with air flowing through the seed apertures from the seed side of the disc to the vacant side thereof pushing the seeds into the seed apertures. In Gilstring the pressure differential is neutralized by providing a resilient wheel rolling against the face of the vacant side of the disc at about the 3:00 o'clock position which blocks airflow through each aperture as it rolls past the wheel, so the seed falls out into the inlet of the seed tube which is mounted on the seed side of the disc directly below the resilient wheel to catch the seeds as they drop.

Thus in pressurized singulating meter of the type disclosed by Gilstring the debris ejector is mounted on the vacant side of the disc below the resilient wheel. Stuck and broken seeds and like debris are thus pushed out of the seed apertures below the inlet of the seed tube and returned into the seed reservoir. Considerable debris may thus build up in the seed reservoir and interfere with the desired accurate dispensing of seeds. The operation of a pressurized singulating meter like that of Gilstring with a debris ejector is illustrated in a video of the operation of a Vaderstad™ singulating meter and the orientation of the debris ejector at https://www.youtube.com/watch?v=4XyXG5B-X0I.

It is common to have two seeds captured in a seed aperture. The Sauder meters disclose a spring biased singulator which is configured to pass along the face of the seed side of the rotating disc adjacent to the path of the seed apertures with lobes of the singulator partially extending over the seed apertures as they pass to dislodge one of the seeds. The Sauder application '536 also addresses the need to conveniently change the singulator for different seeds or to replace the singulator due to wear. A clip arrangement allows the singulator to be quickly removed and replaced. The clip arrangement is configured to ensure the replacement singulator is in the correct orientation and position.

SUMMARY OF THE INVENTION

The present disclosure provides a singulating meter apparatus that overcomes problems in the prior art.

In a first embodiment the present disclosure provides a pressurized singulating meter apparatus comprising a substantially sealed housing, and a seed disc enclosed in the housing and rotatable in a substantially vertical plane, the seed disc having a seed side and an opposite vacant side, the seed disc dividing the housing into a seed housing area and a vacant housing area. A disc drive is operative to rotate the seed disc. A plurality of seed apertures is defined through the seed disc, the seed apertures substantially equally spaced at a substantially equal distance from a rotational axis of the seed disc such that as the seed disc rotates the seed apertures move along a seed aperture path. A seed reservoir is formed in a bottom portion of the seed housing area, and a seed fill port is operative to direct seeds into the seed reservoir, where the seeds fill the seed reservoir to a seed level that is above a bottom portion of the seed aperture path. A seed tube is oriented in a substantially horizontal tube direction with an open seed tube inlet located adjacent to a top portion of a seed face of the seed side of the seed disc and oriented such that as the seed disc rotates the seed apertures move along the seed aperture path toward the seed tube inlet. A pressurized air source directs pressurized air into the seed housing area such that a seed air stream flows into the seed tube inlet, and such that a pressure differential is created between the seed and vacant sides of the seed disc causing an exhaust air stream to flow from the seed housing area to the vacant housing area through each seed aperture as each seed aperture rotates upward out of the seed reservoir, the exhaust air stream pushing at least one seed into the each seed aperture as each seed aperture emerges from the seed reservoir. The exhaust air stream flows out of the vacant housing area through an exhaust port, and the seed fill port is operative to resist passage of pressurized air out of the seed housing area. Each seed aperture moving along the seed aperture path reaches a release position adjacent to the seed tube inlet where a disc pressure neutralizer removes the pressure differential such that the exhaust air stream stops flowing through each seed aperture at the release position and the at least one seed is released and is carried into the seed tube inlet by the seed air stream.

In a second embodiment the present disclosure provides a pressurized singulating meter apparatus comprising a substantially sealed housing, and a seed disc enclosed in the housing and rotatable in a substantially vertical plane, the seed disc having a seed side and an opposite vacant side, the seed disc dividing the housing into a seed housing area and a vacant housing area. A disc drive is operative to rotate the seed disc. A plurality of seed apertures is defined through the seed disc, the seed apertures substantially equally spaced at a substantially equal distance from a rotational axis of the seed disc such that as the seed disc rotates the seed apertures move along a seed aperture path. A seed reservoir is formed in a bottom portion of the seed housing area, and a seed fill port is operative to direct seeds into the seed reservoir where the seeds fill the seed reservoir to a seed level that is above a bottom portion of the seed aperture path. A seed tube is oriented with an open seed tube inlet located adjacent to a seed face of the seed side of the seed disc such that as the seed disc rotates the seed apertures move along the seed aperture path toward the seed tube inlet. A pressurized air source is operative to direct pressurized air into the seed housing area such that a seed air stream flows into the seed tube inlet, and such that a pressure differential is created between the seed and vacant sides of the seed disc causing an exhaust air stream to flow from the seed housing area to the vacant housing area through each seed aperture such that as each seed aperture rotates upward out of the seed reservoir, at least one seed is lodged in each seed aperture as each seed aperture emerges from the seed reservoir. The exhaust air stream flows out of the vacant housing area through an exhaust port, and the seed fill port is operative to resist passage of pressurized air out of the seed housing area. Each seed aperture moving along the seed aperture path reaches a release position adjacent to the seed tube inlet where the disc pressure neutralizer removes the pressure differential such that the exhaust air stream stops flowing through each seed aperture at the release position and the at least one seed is released and is carried into the seed tube inlet by the seed stream. A debris ejector is operative to push an ejector member through each seed aperture from the vacant side of the seed disc to the seed side of the seed disc at an ejector location located such that debris pushed out of each seed aperture by the ejector member is carried into the seed tube by the seed air stream.

In a third embodiment the present disclosure provides a singulating apparatus comprising a seed housing portion and a vacant housing portion releasably attached to each other to form a substantially sealed housing. A seed disc is enclosed in the housing and is rotatable in a substantially vertical plane, the seed disc having a seed side and an opposite vacant side, the seed disc dividing the housing into a seed housing area enclosed by the seed housing portion and a vacant housing area enclosed by the vacant housing portion. A disc drive is operative to rotate the seed disc about a disc rotational axis in a disc rotation direction. A plurality of seed apertures is defined through the seed disc, the seed apertures substantially equally spaced at a substantially equal distance from a rotational axis of the seed disc such that as the seed disc rotates the seed apertures move along a circular seed aperture path. A circular disc shoulder extends outward from the seed side of the seed disc, the disc shoulder having a shoulder radius less than a path radius of the seed aperture path. An alignment guide extends outward from a guide location on the disc shoulder where an outer face of the alignment guide coincides with an outer face of the disc shoulder. The alignment guide extends along the seed side of the seed disc in the disc rotational direction and curves toward the disc rotational axis from an outer end at the guide location to an inner end. A seed reservoir is formed in a bottom portion of the seed housing area. A singulator element is configured to remove excess seeds from the seed apertures as the seed disc rotates when the singulator element is in a singulator operating position with an inner edge of the singulator element bearing against the disc shoulder and an outer edge of the singulator element outside the seed aperture path. An axial bias element is mounted to an interior of the seed housing portion and a radial bias element is mounted to an interior of the seed housing portion. The singulating element is attached to the axial bias element such that the axial bias element exerts an axial bias force on the singulator element toward the seed side of the seed disc, and the radial bias element exerts a radial bias force on the singulator element toward the disc rotational axis. When the seed disc begins to rotate in the disc rotation direction, the inner edge of the singulator element bears against the alignment guide and the singulator element moves outward along the alignment guide against the radial bias force to the singulator operating position.

In a fourth embodiment the present disclosure provides a method for aligning a singulator element on a seed disc of a singulating meter, where the singulating meter comprises a meter housing comprising a seed housing portion and vacant housing portion. The method comprises mounting the singulator element in the seed housing portion such that the singulator element is movable radially and axially; mounting an axial bias element in the seed housing portion operative to exert an axial bias force on the singulator element in a direction outward from the seed housing portion; mounting a radial bias element in the seed housing portion operative to exert a radial bias force on the singulator element toward the disc rotational axis; providing a circular disc shoulder extending outward from a seed side of the seed disc, the disc shoulder having a shoulder radius less than a path radius of a seed aperture path; assembling the singulating meter by engaging the seed disc on a driveshaft of the seed housing portion with the disc shoulder facing the singulator element; rotating the seed disc in the disc rotation direction to exert an outward force on the singulator element against the radial bias force such that the singulator element moves outward against the radial bias force, while the axial bias element exerts the axial bias force on the singulator element toward the seed side of the seed disc, to a singulator operating position where an inner edge of the singulator element bears against an outer face of the disc shoulder.

In a fifth embodiment the present disclosure provides a seed fill port apparatus for directing seeds from a seed source into a seed reservoir of a pressurized singulating meter, the seed reservoir formed between a seed disc and a seed housing portion. The apparatus comprises a conduit connector with a connector face releasably attached to a corresponding reservoir face of the seed housing portion, the conduit connector defining a conduit aperture. A conduit gasket between the connector face and the reservoir face seals the connector face to the reservoir face, and the conduit gasket extends into the conduit aperture. A fill conduit extends through the conduit aperture and the conduit gasket such that an outer wall of the fill conduit is sealed to the conduit gasket, and such that an open outlet end of the fill conduit is oriented to direct the seeds into the seed reservoir.

The presently disclosed singulating meter apparatus directs the seed air stream horizontally such that the furrow opener at the outlet end of the seed tube can be located some significant horizontal distance away without adding additional directional changes as would be required with a conventional singulating meter with a vertical drop at about 3:00 o'clock. Where there are directional changes in the seed tube, the seeds are forced into contact with the tube walls which can adversely affect seed spacing. Pressurized air requirements and thus power requirements are significantly reduced as the exhaust air stream passes through only about one half of the seed apertures in the seed disc. The debris ejector is also configured to push debris from the seed apertures out through the seed tube instead of pushing the debris back into the seed reservoir.

The seed disc includes alignment guides to ensure that the singulator element moves outward to the desired operating position bearing against the disc shoulder of the seed disc, and against the seed side of the seed disc. The disclosed conduit gasket seals both the conduit connector to the opening element, and the fill conduit to the conduit connector and the opening element to prevent the escape of pressurized air. The magnetic attachment of the singulator element to the axial bias element allows the singulator element to be easily removed and replaced while ensuring proper positioning.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 18 is a side view of the singulator element with the axial and radial bias elements in place and bearing against one of the ramp members;

FIG. 19 is an end view of the singulator element as shown in FIG. 18;

FIG. 20 is a perspective view of the singulator element as shown in FIG. 18;

DETAILED DESCRIPTION OF THE ILLUSTRATED EMBODIMENTS

Figure 1:
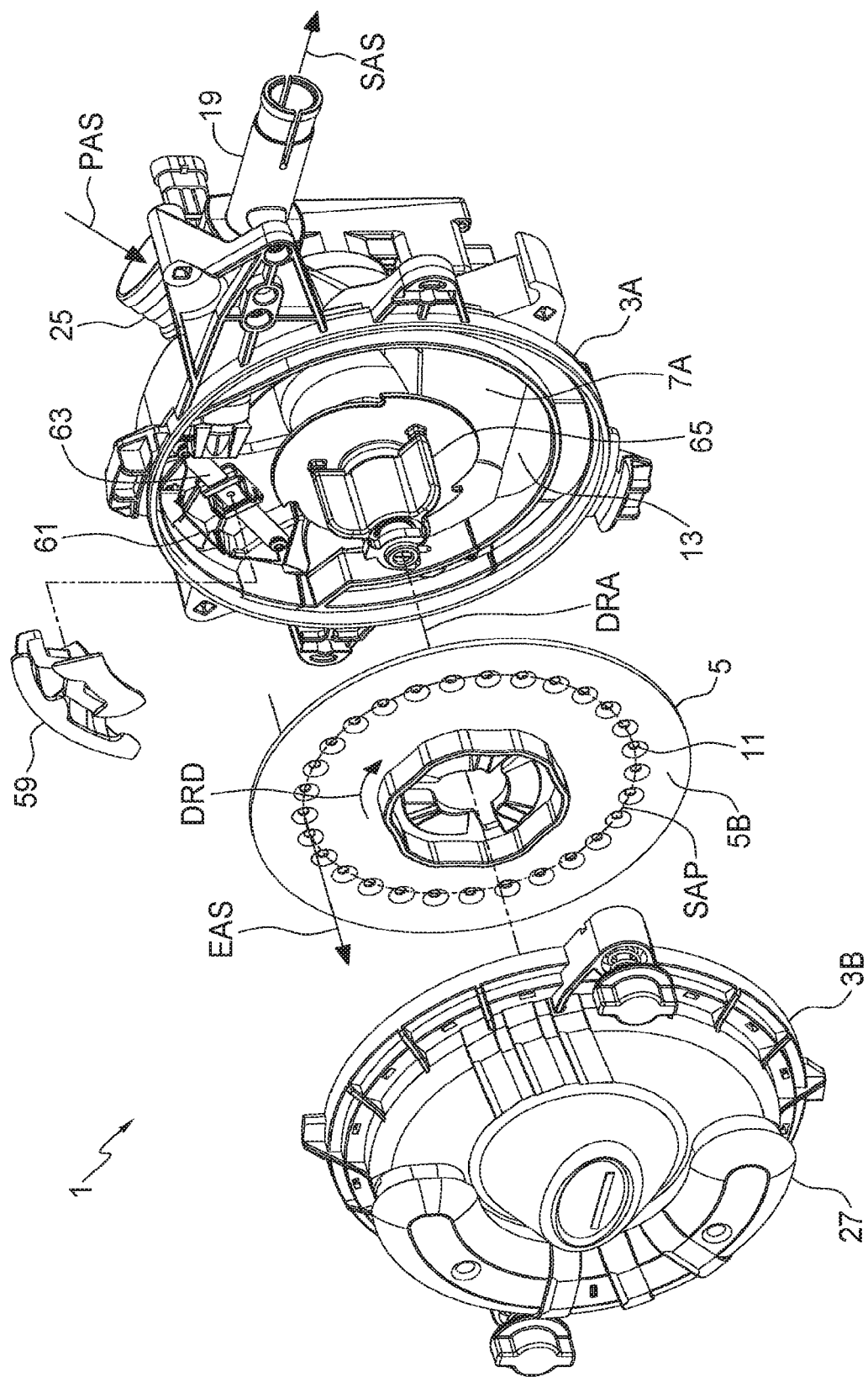
FIG. 1 is an exploded perspective view of an embodiment of the singulating meter apparatus of the present disclosure.

FIGS. 1-11 illustrate an embodiment of a pressurized singulating meter apparatus 1 of the present disclosure. The apparatus 1 comprises a substantially sealed meter housing 3 formed by a seed housing portion 3A and a vacant housing portion 3B releasably attached to each other. A seed disc 5 is enclosed in the housing and is rotatable in a substantially vertical plane, the seed disc 5 having a seed side 5A and an opposite vacant side 5B, the seed disc dividing the housing into a seed housing area 7A and a vacant housing area 7B.

A disc drive 9, here provided by an electric motor, is operative to rotate the seed disc 5. Seed apertures 11 are defined through the seed disc 5. The seed apertures 11 are substantially equally spaced at a substantially equal distance from a rotational axis DRA of the seed disc 5 such that as the seed disc 5 rotates in a disc rotation direction DRD the seed apertures 11 move along a seed aperture path SAP, where the centers of the seed apertures 11 are a path radius R1 from the rotational axis DRA.

Figure 5:
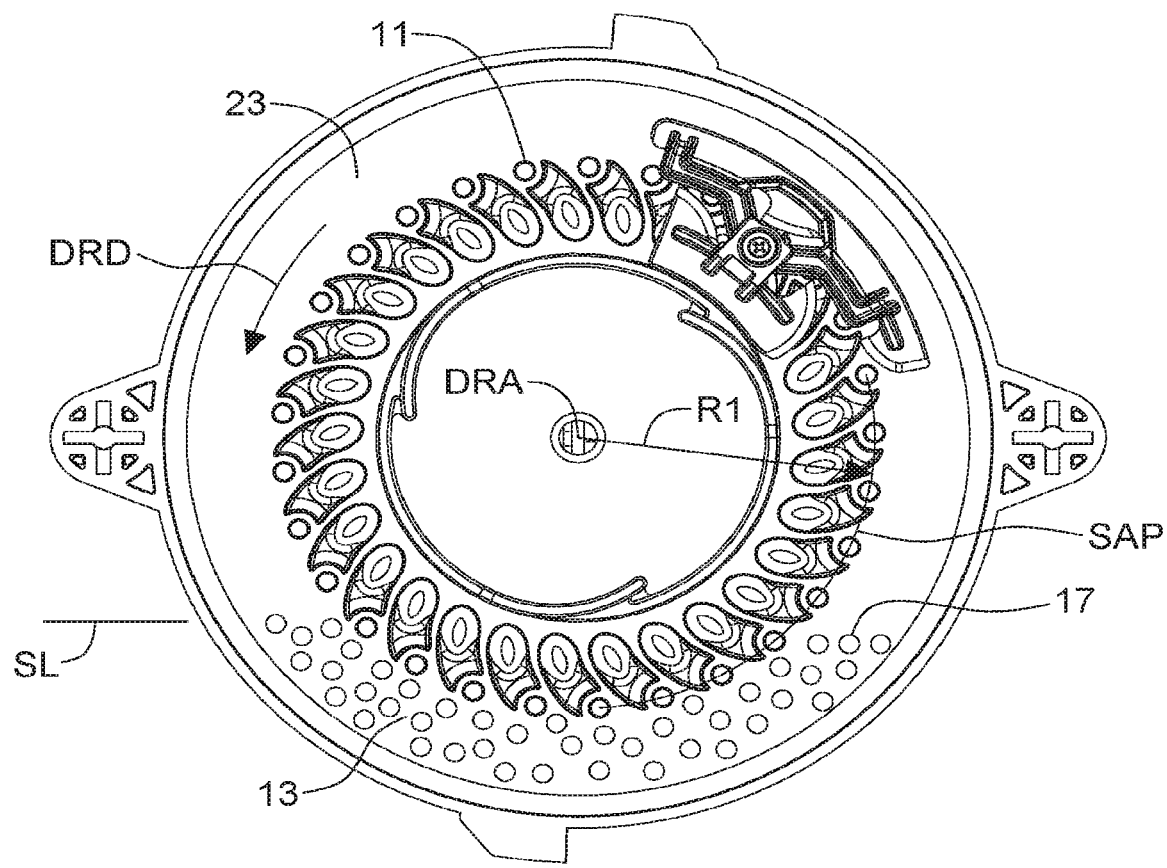
FIG. 5 is side view of the seed disc with the singulator element in the operating position.

A seed reservoir 13 is formed in a bottom portion of the seed housing area 7A, and a seed fill port 15 is operative to direct seeds 17 into the seed reservoir 13. The seeds 17 fill the seed reservoir to a seed level SL that is above a bottom portion of the seed aperture path SAP as shown in FIG. 5.

A seed tube 19 is oriented in a substantially horizontal tube direction with an open seed tube inlet 21 located adjacent to a top portion of a seed face 23 of the seed side 5A of the seed disc 5 and oriented such that as the seed disc 5 rotates the seed apertures 11 move along the seed aperture path SAP toward the seed tube inlet 21.

Figure 5A:
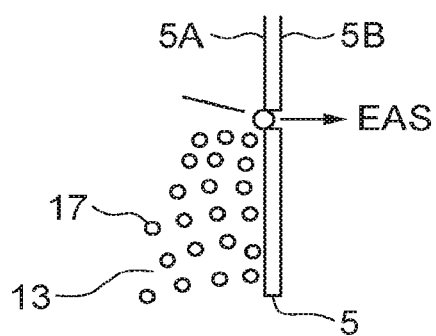
FIG. 5A is a schematic sectional end view of the seed disc showing a seed being pushed into a seed aperture by the exhaust air stream.

A pressurized air source is operative to direct pressurized air in the form of a pressurized air stream PAS into the seed housing area 7A through air inlet 25 such that a seed air stream SAS flows into the seed tube inlet 21 and into the seed tube 19 and downstream to a furrow opener. The pressurized air stream PAS entering the seed housing area 7A creates a pressure differential between the seed side 5A and the vacant side 5B of the seed disc 5 causing an exhaust air stream EAS to flow from the seed housing area 7A to the vacant housing area 7B through each seed aperture 11 as each seed aperture rotates upward out of the seed reservoir 13. As is known in the art the exhaust air stream EAS pushes at least one seed 17 into the each seed aperture 11 such that as each seed aperture 11 emerges from the seed reservoir 13, as seen in FIG. 5A, a seed 17 is lodged in the seed aperture 11. As is also known in the art occasionally no seed 17 is picked out of the seed reservoir 13.

The exhaust air stream EAS flows out of the vacant housing area 7A through an exhaust port 27 to the atmosphere. The exhaust port 27 is provided by a vented cap over a part of the vacant housing portion 3B. The seed fill port 15 is configured to resist the passage of pressurized air out of the seed housing area 7A. For example seed may enter the seed fill port 15 from a sealed container above the port 15 so air cannot pass out of the meter housing 3 through the seed fill port 15. Thus the pressurized air stream PAS entering the seed housing portion 3A of the assembled meter housing 3 can only exit as the seed air stream SAS through the seed tube inlet 21 or as the exhaust air stream EAS through the seed apertures 11 and through the exhaust port 27.

Figure 9:
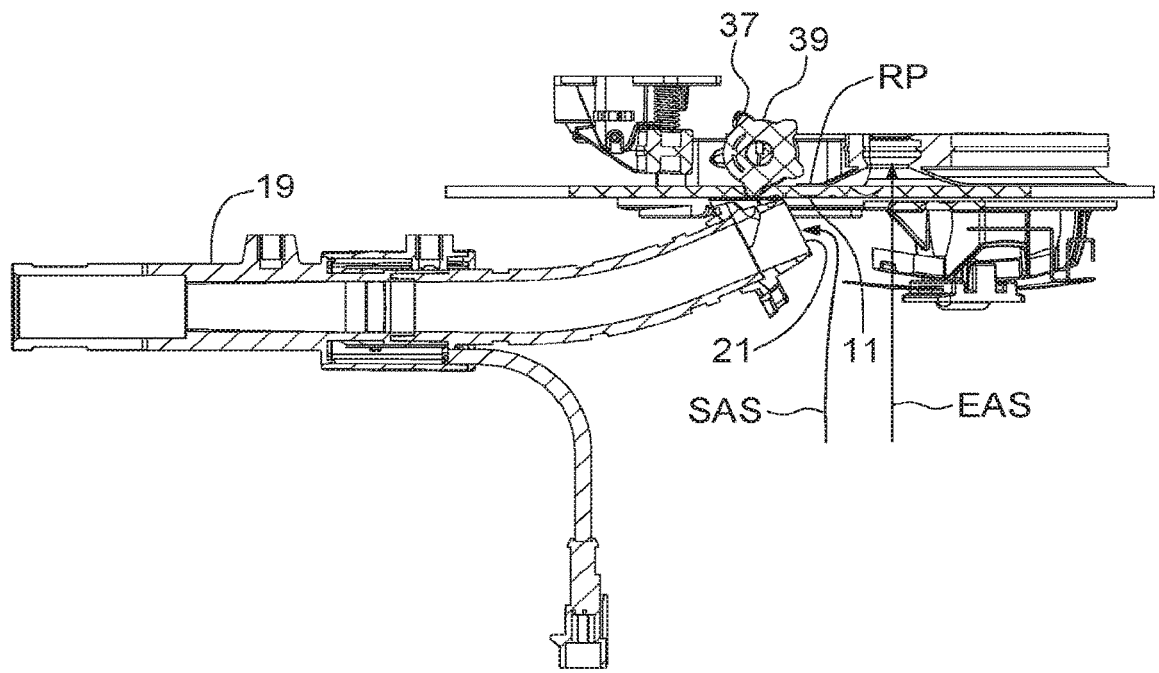
FIG. 9 is a sectional view along line 7-7 in FIG. 7.

As best seen in FIG. 9, each seed aperture 11 moving along the seed aperture path SAP reaches a release position RP adjacent to the seed tube inlet 21 where a disc pressure neutralizer removes the pressure differential such that the exhaust air stream EAS stops flowing through each seed aperture 11 at the release position RP and the seed in the seed aperture 11 is released and is carried into the seed tube inlet 21 by the seed air stream SAS. The seed tube 19 is oriented substantially tangential to the top of the seed aperture path SAP with the seed tube inlet 21 aligned with the seed apertures 11 moving along the seed aperture path SAP and the release position RP is substantially at the top of the seed aperture path SAP.

Figure 2:
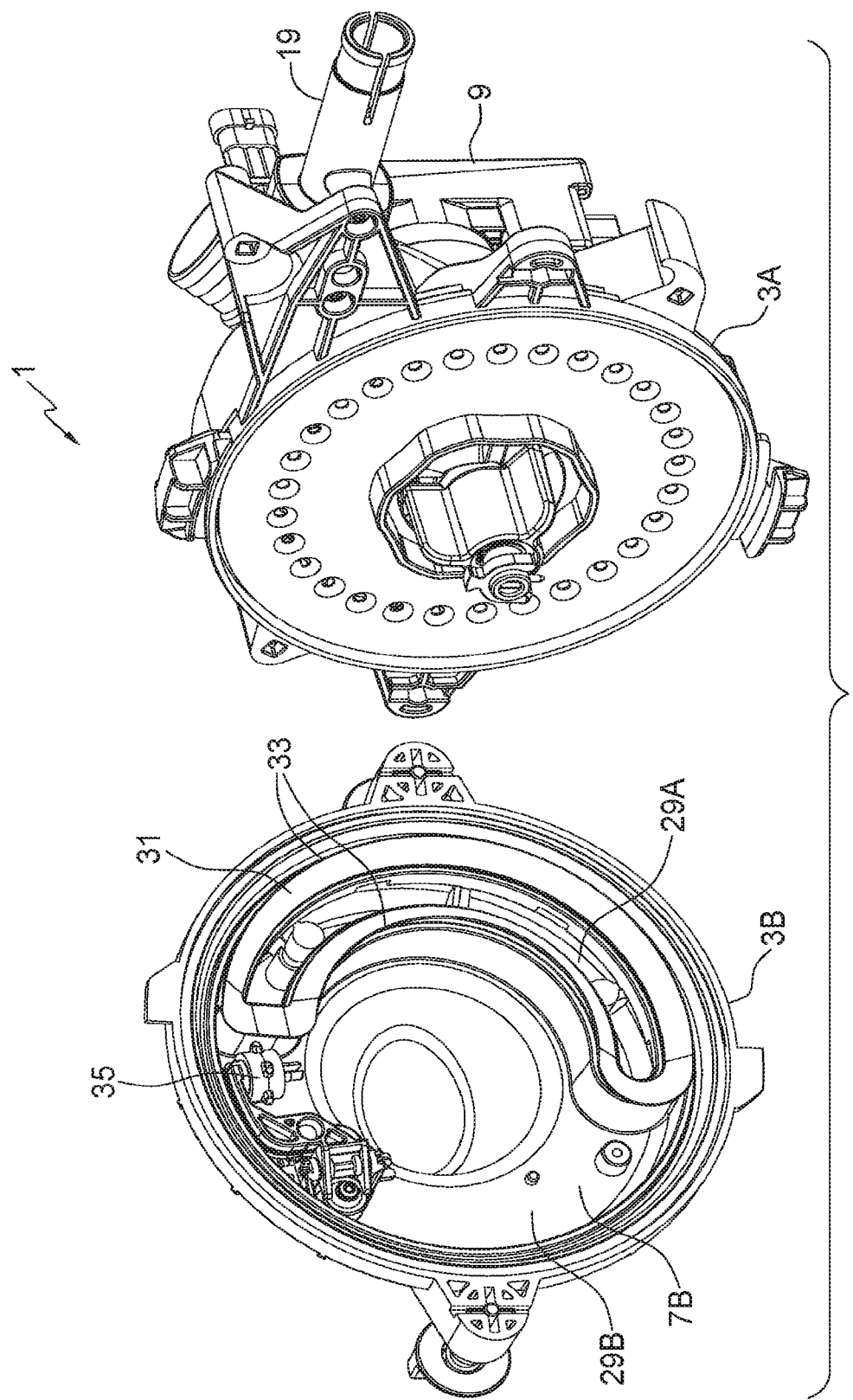
FIG. 2 is a perspective view of the embodiment of FIG. 1 with the seed disc in the operating position in the seed housing portion, and showing the inside of the vacant housing portion.
Figure 3:
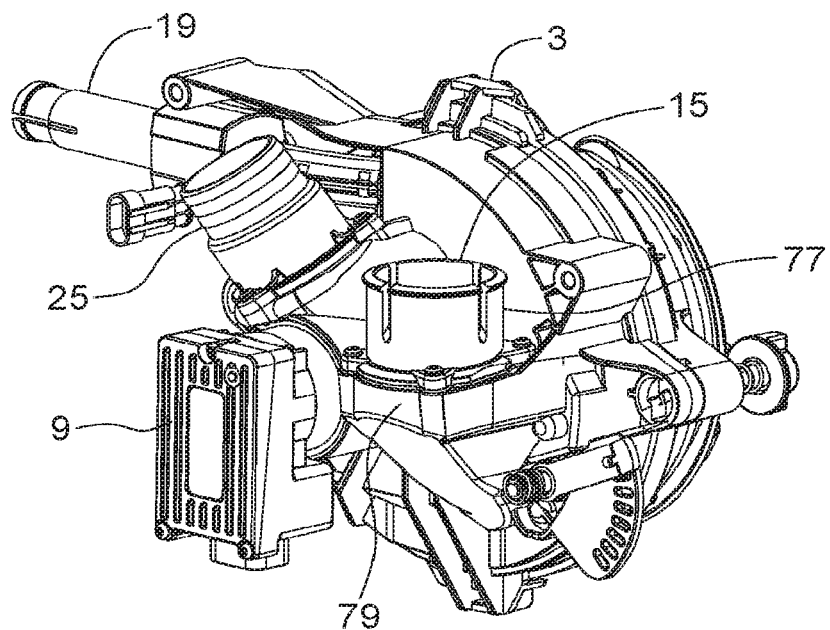
FIG. 3 is a front perspective view of the embodiment of FIG. 1 assembled.
Figure 4:
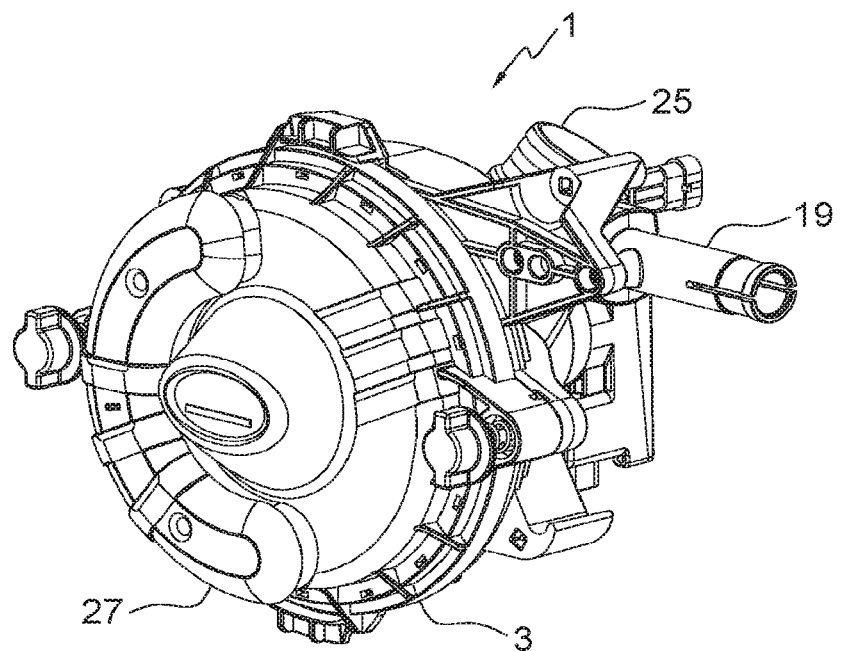
FIG. 4 is a rear perspective view of the embodiment of FIG. 1 assembled.

As seen in FIG. 2, the vacant housing area 7B is divided into an active area 29A connected to the exhaust port 27, and an idle area 29B. The active area 29A is formed by a hollow seal member 31 with seal edges 33 of the seal member 31 sealed to the vacant side 5B of the seed disc 5 such that an interior of the hollow seal member 31 forms the active area 29A and is isolated from the idle area 29B. The inner and outer portions of the seal edges 33 follow a substantially radial arc along the vacant side 5B of the seed disc 5 on each side of the seed aperture path SAP.

Figure 11:
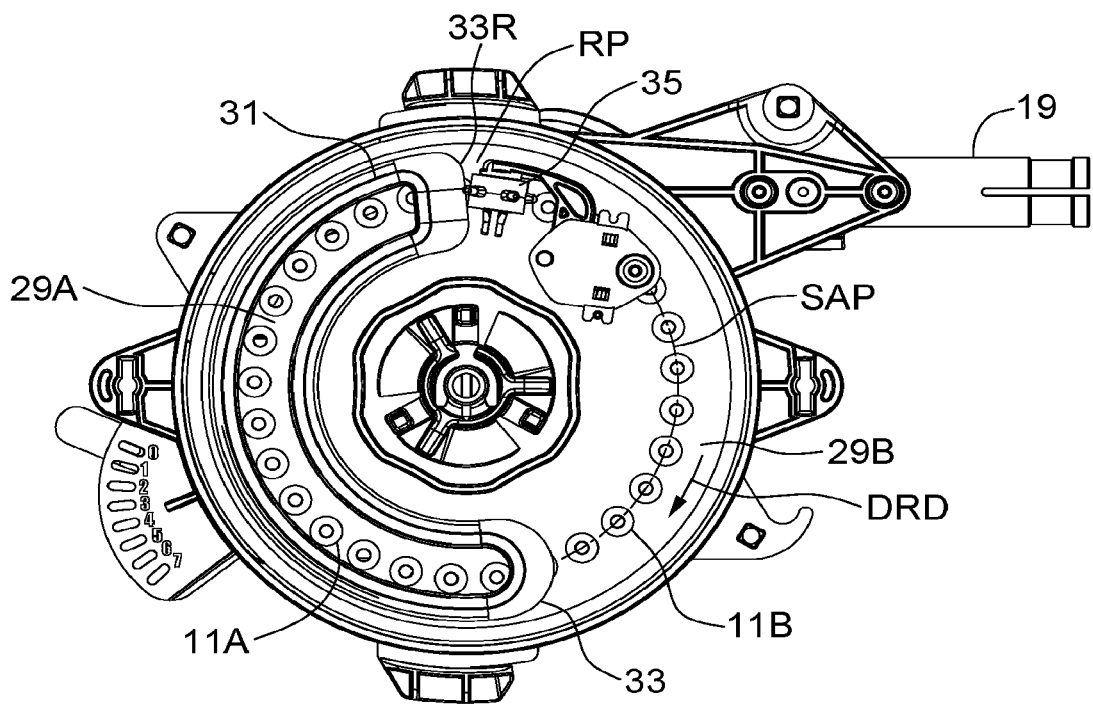
FIG. 11 is a side view of the seed housing portion with the vacant housing portion removed and the seed disc in place showing the operating position of the seal member and debris ejector.

As best seen in FIG. 11, as the seed disc 5 rotates, the seed apertures 11 on the bottom portion of the seed aperture path SAP slide into a bottom portion of the seal member 31 below the seed level SL and then slide out of a top portion of the seal member 31 adjacent to the release position RP. With this arrangement then the exhaust stream EAS flows only through active seed apertures 11A that are within the active area 29A, and substantially no air flows through idle seed apertures 11B that are within the idle area 29B because there is nowhere for the air to go. Thus there is no air pressure differential between the seed side 5A and the vacant side 5B of the seed disc 5 in the idle area 29B.

Thus the disc pressure neutralizer is provided by an upper end portion of the seal edge 33R that divides the active area 29A from the idle area 29B adjacent to the release position RP. At that point the seed apertures change from being the active seed apertures 11A in the active area 29A to being the idle seed apertures 11B in the idle area 29B, the exhaust air stream EAS stops pushing the seeds into the seed apertures 11, and the seeds are released to be carried by the seed air stream SAS into the closely adjacent seed tube inlet 21.

The illustrated apparatus 1 thus reduces the pressurized air volume required to be directed into the air inlet 25 because instead of having an exhaust air stream flowing through every seed aperture 11 and out an exhaust port at all times, the exhaust air stream EAS flows only through the active seed apertures 11A and out to the atmosphere, while no air flows through the inactive seed apertures 11B. The active seed apertures 11A are only about one half of the total number of seed apertures 11. Since all the active seed apertures 11A also have a seed 17 blocking most of the airflow, the pressurized air requirement is significantly reduced.

With the release point RP at the top of the seed disc 5 at about the 12:00 position, the seeds are also carried only through about 180 degrees instead of about 270 degrees as is common in the prior art, reducing the chance that a seed may be dislodged when the implement is travelling over rough ground.

The apparatus 1 also comprises a debris ejector 35 operative to push an ejector member 37 through each seed aperture 11 from the vacant side 5B of the seed disc to the seed side 5A of the seed disc 5 at an ejector location in the idle area 29B of the vacant housing area 7B adjacent to the upper end portion 33R of the seal edge 33 such that broken seeds or like debris pushed out of each seed aperture 11 by the ejector member 37 is carried into the seed tube inlet 21 by the seed air stream SAS. The illustrated debris ejector 35 comprises an ejector wheel 39 with a plurality of the ejector members 37 extending radially from the ejector wheel.

In common prior art singulating meters the disc pressure neutralizer is provided by a resilient wheel rolling against the vacant side 5B of the seed disc 5. This resilient wheel is typically quite large, and so there is no room between the release point, where the wheel blocks a seed aperture, and the seed tube inlet 21 to place a debris ejector. Thus the prior art debris ejectors commonly are mounted away from the seed tube inlet so broken seeds and like debris pushed out by the ejector members returns to the seed reservoir 13 where such debris can accumulate and interfere with pick up of the seeds.

Figure 12:
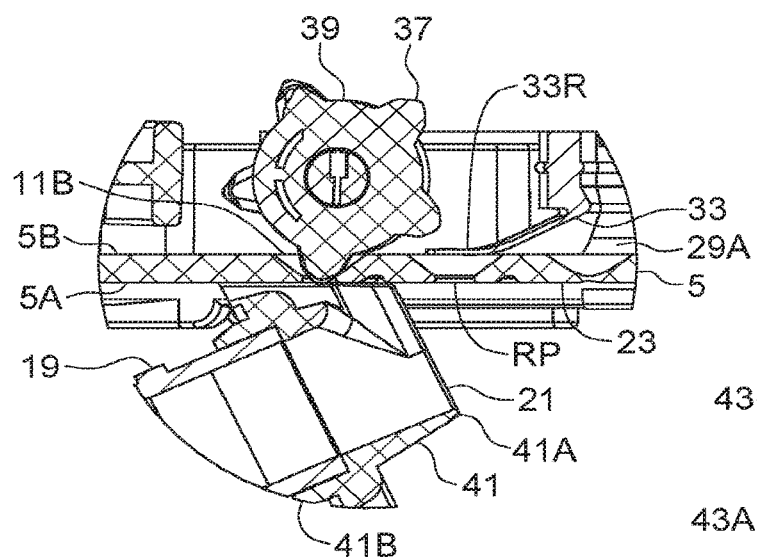
FIG. 12 is a schematic sectional top view showing the seed tube inlet oriented to receive seeds from the seed apertures at the release point, and also receive debris pushed out of the seed apertures by the debris ejector.
Figure 12A:
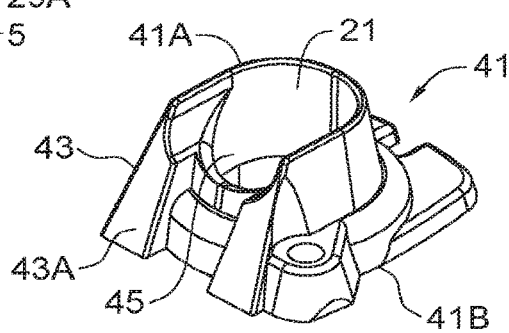
FIG. 12A is a schematic end view of the extractor member that forms the seed tube inlet.

FIG. 12 schematically illustrates the debris ejector of the apparatus 1 where an extractor member 41 defines the seed tube inlet 21 at a first end 41A and is connected at a second end 41B to the seed tube 19. The extractor member 41 is also illustrated in FIGS. 6-9. FIG. 12A shows a perspective view of the extractor member 41. The extractor member comprises flanges 43 extending toward the seed face 23 on each side of the seed aperture path. Flange faces 43A of the flanges 43 are configured to slide along the seed face 23. The extractor member 41 defines a notch 45 extending from the seed tube inlet 21 at the first end 41A of the extractor member 41 toward the second end 41B of the extractor member between the flanges 43. The notch 45 is open to the seed face 23 to receive the debris pushed out by the ejector members 37 which debris is then carried downstream through the seed tube 19 by the seed air stream SAS.

Figure 12B:
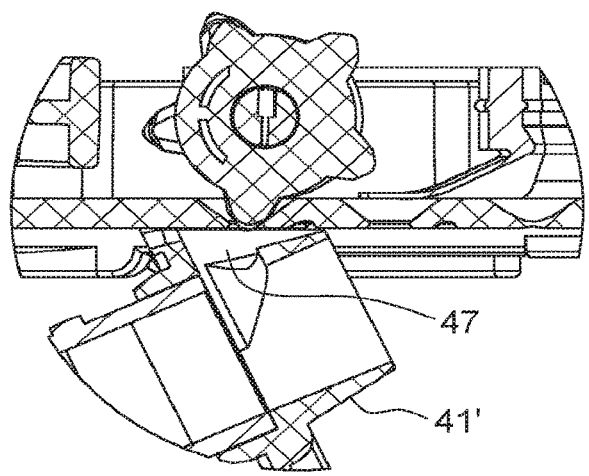
FIG. 12B is a schematic side view of the extractor member of FIG. 12A.
Figure 12C:
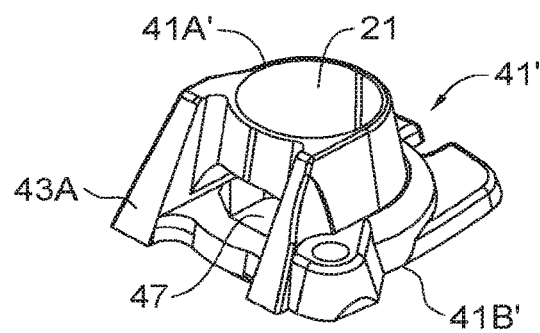
FIG. 12C is a schematic side view of an alternate extractor member.

FIG. 12B schematically illustrates an alternate extractor member 41' installed on the seed tube 19. FIG. 12C shows a perspective view of the extractor member 41', where instead of a notch as in the extractor member 41, a hole 47 is defined in a middle portion of the extractor member 41' between the first and second ends thereof. Again the extractor member 41' comprises flanges 43 extending toward the seed face on each side of the seed aperture path and flange faces 43A of the flanges 43 are again configured to slide along the seed face 23. The seed extractor 41' thus provides essentially a debris opening in the wall of the seed tube 19 downstream of the seed tube inlet 21 at the first end 41A' of the extractor member 41' and adjacent to the seed face 23 of the seed side 5A of the seed disc 5 and adjacent to the ejector location. The seed air stream SAS flows into the seed tube 19, attached at the second end 41B' of the extractor member 41', through the seed tube inlet 21, and carries the debris pushed out of each seed aperture 11 by the ejector member 37 and into the debris opening downstream through the seed tube 19.

Figure 13:
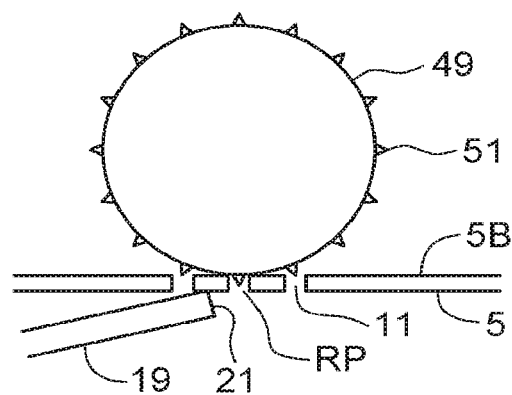
FIG. 13 is a schematic sectional top view of an alternate disc pressure neutralizer provided by a resilient wheel with ejector members extending radially from the wheel.

FIG. 13 schematically illustrates an alternate disc pressure neutralizer comprising a sealing wheel 49 positioned to rotate along the vacant side 5B of the seed disc 5 at the release position RP as the seed disc rotates such that the seed apertures 11 are sealed at the release position by the resilient face of the wheel 49 bearing against vacant side of the disc. The illustrated sealing wheel includes a plurality of ejector members 51 extending radially from the sealing wheel 49 and configured as illustrated such that an ejector member 51 enters each seed aperture 11 as the sealing wheel 49 seals the seed aperture pushing debris out of each seed aperture 11. The ejector location here coincides with the release position RP.

Figure 14:
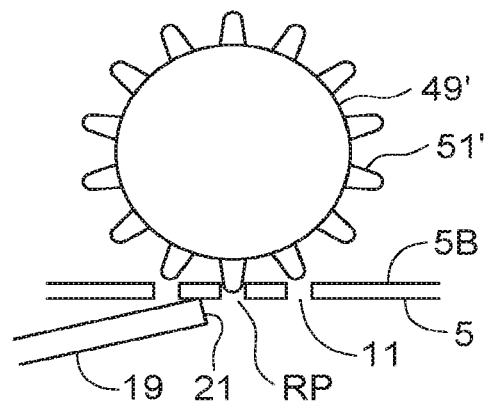
FIG. 14 is a schematic sectional top view of an alternate disc pressure neutralizer provided by a wheel with resilient ejector members extending radially from the wheel to seal the seed apertures and also push debris out of the seed apertures.

FIG. 14 schematically illustrates a further alternate disc pressure neutralizer comprising a sealing wheel 49' positioned to rotate along the vacant side 5B of the seed disc 5 at the release position RP as the seed disc rotates. Here the sealing wheel includes a plurality of resilient ejector members 51' extending radially from the sealing wheel 49' and configured to enter and seal each seed aperture 11 as the seed disc rotates. Thus the ejector members 51' push debris out of each seed aperture 11 and also seal the seed apertures 11 and the face of the sealing wheel 49' is removed from the vacant side 5B of the seed disc 5. Here again the ejector location coincides with the release position RP.

Figure 15:
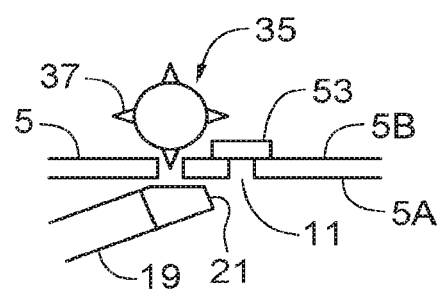
FIG. 15 is a schematic sectional top view of an alternate disc pressure neutralizer provided by a resilient sealing pad bearing against the vacant side of the seed disc.

FIG. 15 schematically illustrates a further alternate disc pressure neutralizer comprising a resilient sealing pad 53 positioned to slide along the vacant side 5B of the seed disc 5 at the release position RP as the seed disc rotates such that the seed apertures 11 are sealed at the release position RP and the seeds fall out of the seed apertures and are carried into the seed tube inlet 21 by the seed air stream. A debris ejector 35 similar to that shown in FIG. 12 is operative to push an ejector member 37 through each seed aperture 11 from the vacant side 5B of the seed disc 5 toward the seed side 5A of the seed disc 5 at an ejector location adjacent to the resilient sealing pad 53 such that debris pushed out of each seed aperture 11 by the ejector member 37 is carried into the seed tube 19 by the seed air stream. The ejector location here is adjacent to the release position RP but close enough that the debris can be pushed into the seed air stream SAS and into the seed tube inlet 21.

Figure 16:
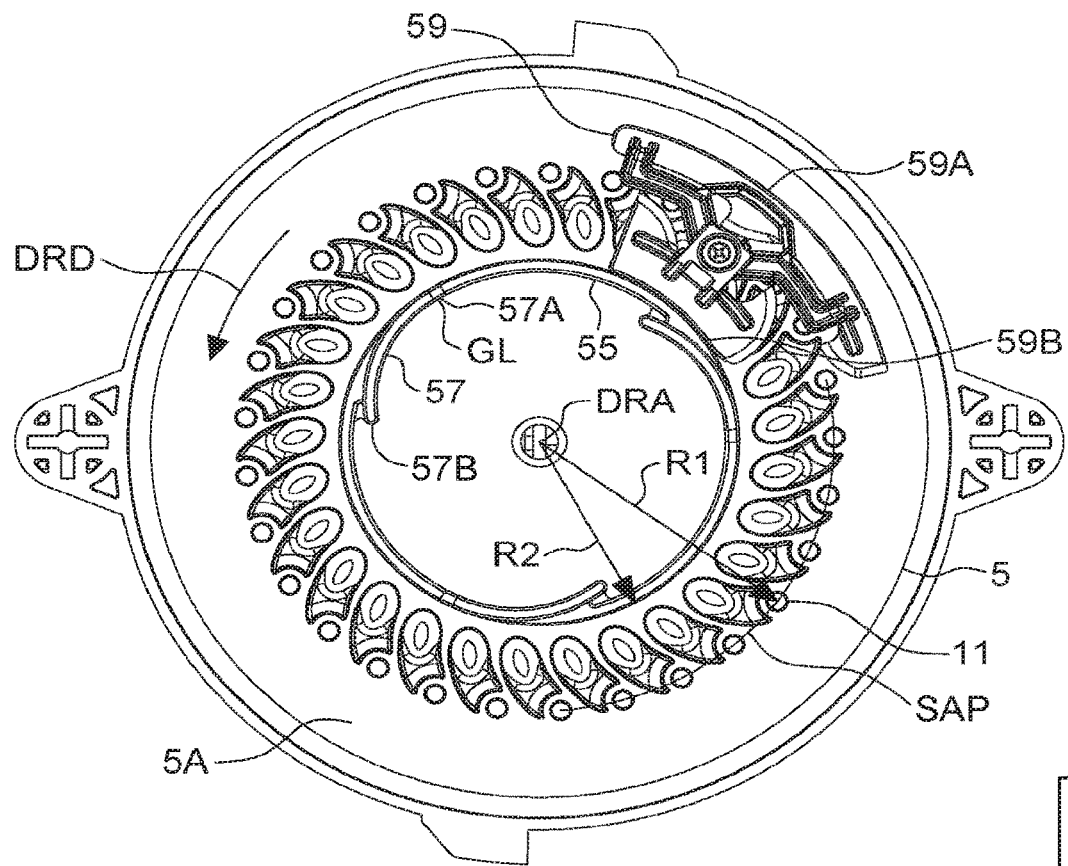
FIG. 16 is a side view of a seed disc with alignment guides provided by ramp members and where the singulator element is in the operating position with the inner edge thereof bearing against the outer face of the disc shoulder.
Figure 17:
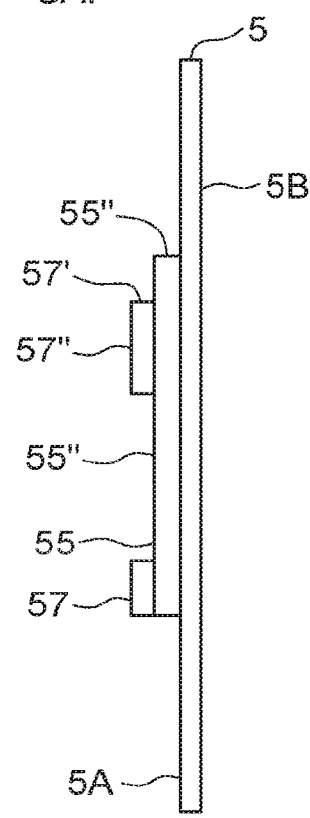
FIG. 17 is a schematic end view of the seed disc showing the disc shoulder and the alignment guides.

A circular disc shoulder 55 extends outward from the seed side 5A of the seed disc 5, the disc shoulder 55 having an outside shoulder radius R2 less than a path radius R1 of the seed aperture path SAP. As shown in FIGS. 16 and 17, an alignment guide, here provided by a ramp member 57, extends laterally outward from a guide location GL on the disc shoulder 55 where an outer face 57' of the ramp member 57 coincides with an outer face 55' of the disc shoulder 55. The ramp member 57 extends along the seed side 5A of the seed disc 5 in the disc rotational direction DRD and curves inward toward the disc rotational axis DRA from an outer end 57A at the guide location GL to an inner end 57B.

Figure 6:
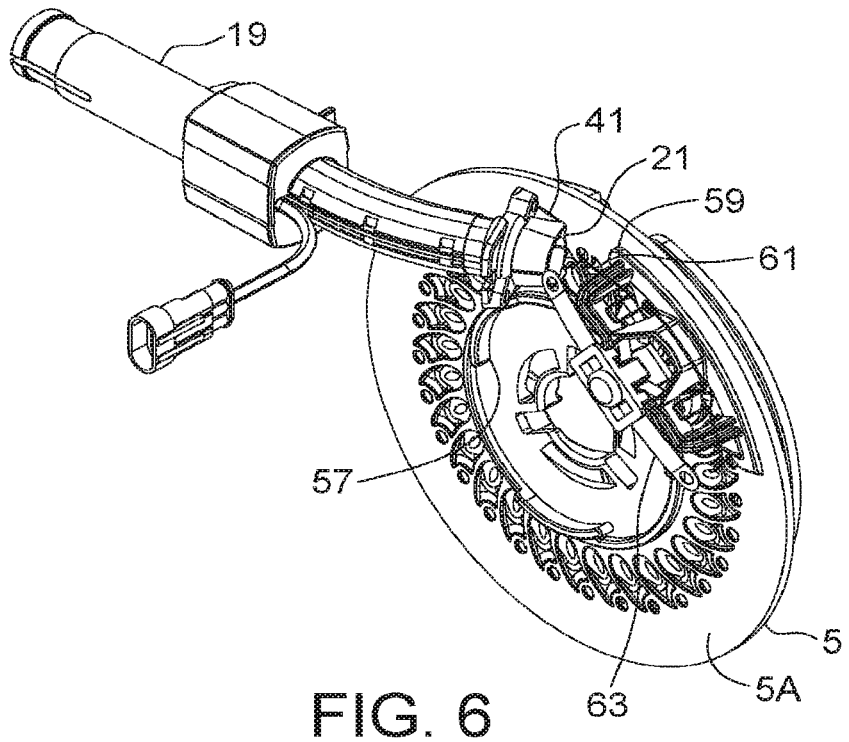
FIG. 6 is a perspective view of the seed disc with the singulator element, the seed tube, the axial bias element, and the radial bias element all in the operating position.
Figure 7:
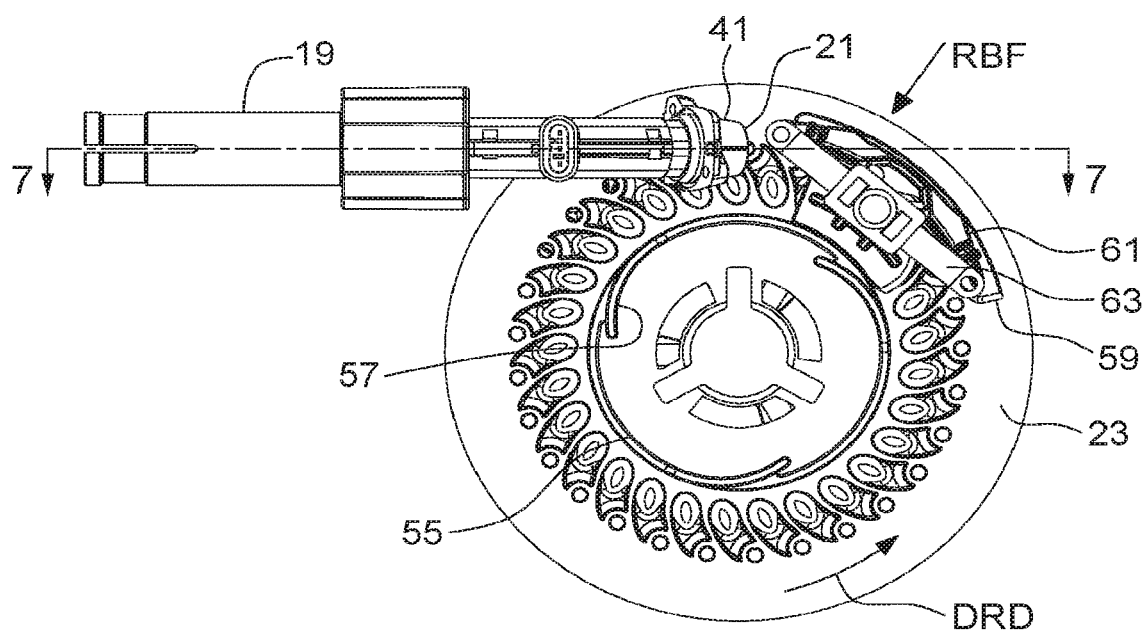
FIG. 7 is a side view of the seed disc as shown in FIG. 6.
Figure 8:
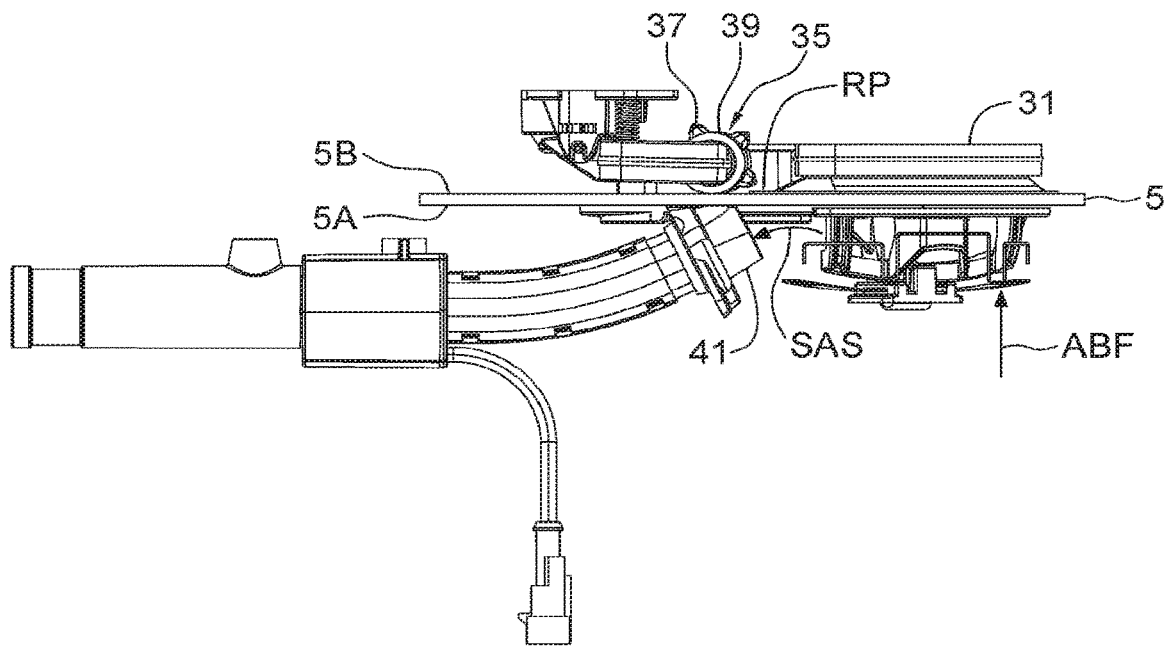
FIG. 8 is a top view of the seed disc as shown in FIG. 6.

A singulator element 59, shown in detail in FIGS. 18-20, is configured, as is known in the art, to remove excess seeds from the seed apertures 11 as the seed disc 5 rotates when the singulator element 59 is in the singulator operating position shown in FIG. 16, and also as shown in FIGS. 5, 6, and 7, with an outer edge 59A of the singulator element 59 outside the seed aperture path SAP and an inner edge 59B of the singulator element 59 bearing against outer face 55' of the disc shoulder 55.

Figure 10:
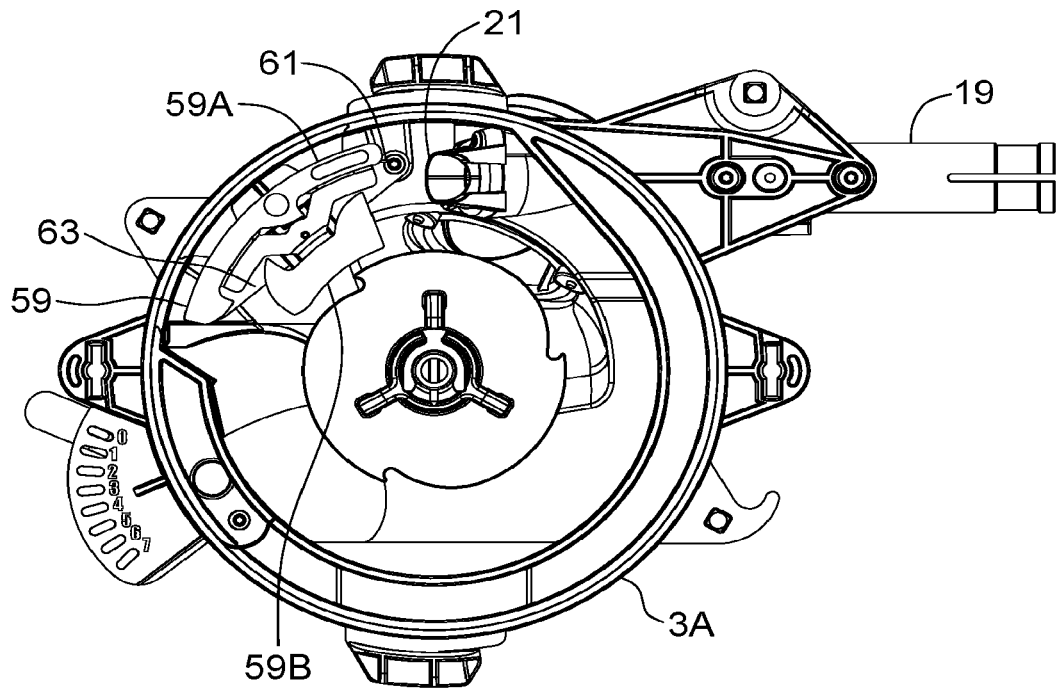
FIG. 10 is side view of the seed housing portion with the seed disc removed and the singulator element, the seed tube, the axial bias element, and the radial bias element all in the operating position.

As shown in FIGS. 1 and 10, an axial bias element 63 is secured to an interior of the seed housing portion 3A at opposite ends thereof by fasteners 63B through attachment holes 63A. The fasteners 63B are smaller in diameter than the attachment holes 63A and allow movement of the axial bias element 63 with respect to the seed housing portion 3A. A radial bias element 61 is mounted to an interior of the seed housing portion 3A of the meter housing 3. The singulating element 59 is attached to the axial bias element 63 such that the axial bias element exerts an axial bias force ABF on the singulator element toward the seed side 5A of the seed disc 5, and the radial bias element 61 exerts a radial bias force RBF on the singulator element 59 toward the disc rotational axis DRA.

The illustrated seed disc 5 includes a plurality of ramp members 57, each ramp member 57 extending laterally outward from one of a like plurality of guide locations GL equally spaced along the disc shoulder 55. During assembly the seed side 5A of the seed disc 5 is moved toward the seed housing portion 3A into engagement with the drive shaft 65 and against the axial bias force ABF. The singulator element 59 is held in about the correct position by its attachment to the axial bias element 63, however the side face 59" of the singulator element 59, which is inside the seed housing portion 3A and not visible, may lie anywhere along the side face 55" of the disc shoulder 55 or may lie along the side face 57" of one of the ramp members 57. The radial movement of the singulator element 59 is limited by the fasteners 63B in the attachment holes 63A such that the inner edge 59B of the singulator element 59 cannot move below the inner end 57B of the ramp member 57.

If during assembly the side face 59" of the singulator element 59 lies along the side face 57" of one of the ramp members 57, when the seed disc 5 begins to rotate in the disc rotation direction DRD, either turned by hand or by the disc drive 9 rotating the driveshaft 65, the side face 59" of the singulator element 59 slides off the face 57" of ramp member 57 and then comes into contact with the side face 55" of the disc shoulder 55 and the inner edge 59B of the singulator element 59 comes into contact with and bears against the curved outer face 57' of the next following one of the ramp members 57 which then exerts an outward force OF on the inner edge 59B of the singulator element 59 and forces the singulator element 59 outward along the ramp member 57 against the radial bias force RBF to the guide location GL where the axial bias force ABF pushes the singulator element 59 onto the disc shoulder 55 to the desired singulator operating position with the inner edge 59B of the singulator element 55 bearing against the outer face 55' of the disc shoulder 55 and the side face 59" of the singulator element 59 bearing against the seed side 5A of the seed disc 5.

FIGS. 18-20 show the singulator element 59 contacting the ramp member 57, and shows the connected radial bias element 61 and axial bias element 63. Since the singulator element must be removed and replaced for different crops and to address wear and the like, the singulating element 59 is releasably attached to the axial bias element 63, which is secured in the seed housing portion 3A at opposite ends thereof by fasteners 63B through attachment holes 63A. The illustrated singulator element 59 is releasably attached to the axial bias element 63 by magnetic attraction.

The fasteners 63B, being fixed to the seed housing portion 3A and smaller in diameter than the attachment holes 63A, allow sufficient movement of the axial bias element 63 with respect to the seed housing portion 3A to allow the singulator element 59 to ride outward along the ramp member 57 to the singulator operating position as described above.

The magnetic attraction is provided by a first magnet 67 fixed to the axial bias element 63, and a second magnet 69 fixed to the singulator element 59. The first magnet 67 is mounted in a magnet case 71, and the magnet case 71 and singulator element 59 comprise interlocking protrusions 73 and corresponding recesses 75 configured to maintain the magnet case 71 in a desired position with respect to the singulator element 59.

Figure 21:
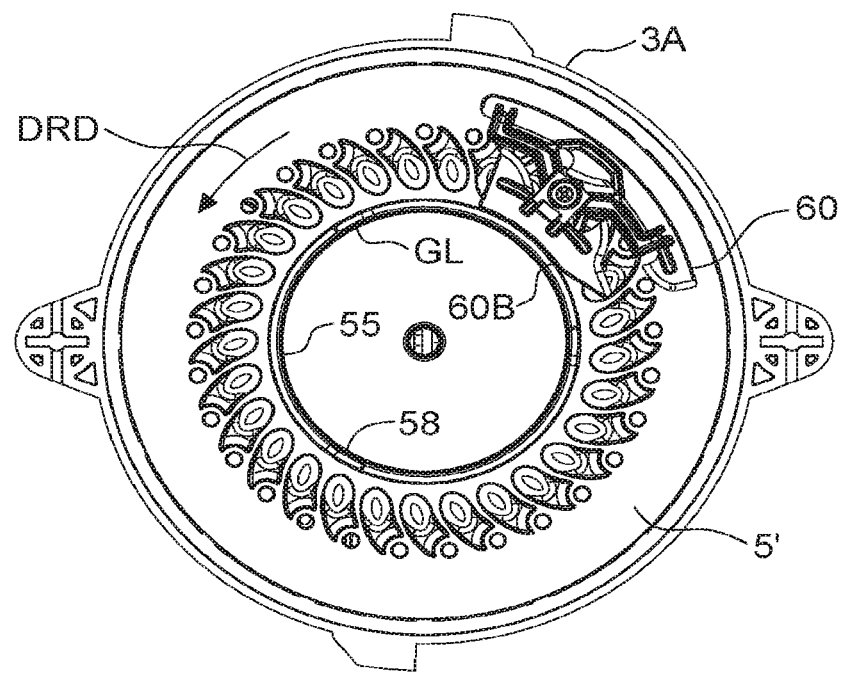
FIG. 21 is a side view of a seed disc with alignment guides provided by guide bars and where the singulator element is in the operating position with the inner edge thereof bearing against the outer face of the disc shoulder.
Figure 22:
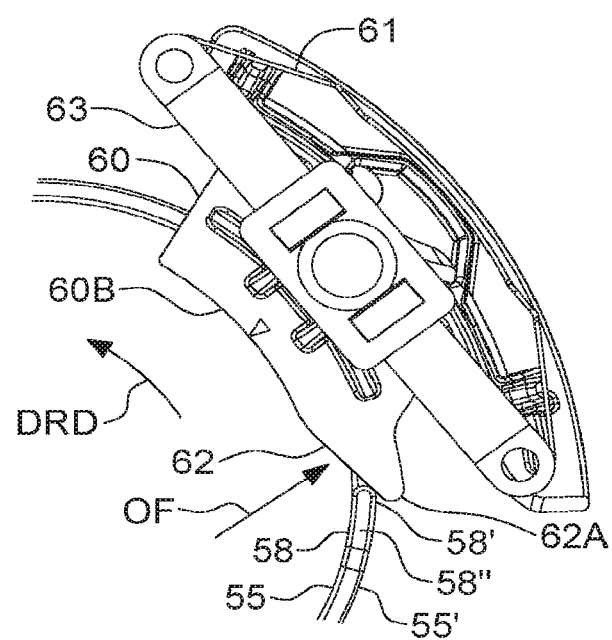
FIG. 22 is a side view of an alternate singulator element with the axial and radial bias elements in place and bearing against one of the guide bars.

FIGS. 21 and 22 illustrate an alternate alignment guide on a seed disc 5' provided by a guide bar 58 and wherein an outer surface 58' of the guide bar 58 coincides with the outer face 55' of the disc shoulder 55 at the guide location GL. In this alternate alignment guide the ramping action is provided by the singulator element 60 which comprises a ramp surface 62 sloping outward from the inner edge 60B of the singulator element 60 in a direction opposite to the disc rotation direction DRD. A plurality of guide bars 58 are provided, each guide bar 58 extending outward from one of a like plurality of guide locations GL equally spaced along the disc shoulder 55. The radial movement of the singulator element 59 is limited by the fasteners 63B in the attachment holes 63A such that the outer end 62A of the ramp surface 62 on the singulator element 60 cannot move below the outer surface 58' of the guide bars 58.

If during assembly the side face 59" of the singulator element 59 lies along the side face 58" of one of guide bars 58, when the seed disc 5 begins to rotate in the disc rotation direction DRD, either turned by hand or by the disc drive 9 rotating the driveshaft 65, the side face 59" of the singulator element 59 slides off the side face 58" of guide bar 58 and then comes into contact with the side face 55" of the disc shoulder 55 and ramp surface 62 of the singulator element 60 comes into contact with and bears against the next following one of the guide bars 58.

The guide bar 58 exerts the outward force OF on the singulator element 60, and the ramp surface 62 will ride up the guide bar 58 until the inner edge 60B of the singulator element 60 coincides with the outer face 55' of the disc shoulder 55, and then the axial bias force ABF pushes the singulator element 60 onto the disc shoulder 55 in the desired singulator operating position. Instead of a bar 58 as illustrated, a series of pins or the like extending from the disc shoulder 55 with an outer surface aligned with the outer face 55' of the disc shoulder could be used.

In a typical assembly operation the seed disc 5, 5' will be manually rotated in the disc rotation direction DRD to move the singulator element 59, 60 to the operating position, and then the vacant housing portion 3B will be attached to the seed housing portion 3A. It is also possible to simply engage the seed disc 5, 5' on the driveshaft 65 and then attach the vacant housing portion 3B to the seed housing portion 3A without regard to the position of the singulator element 59, 60. When the disc drive 9 is operated the seed disc 5, 5' will rotate in the disc rotation direction DRD and the singulator element 59, 60 will move to the desired singulator operating position.

Figure 23:
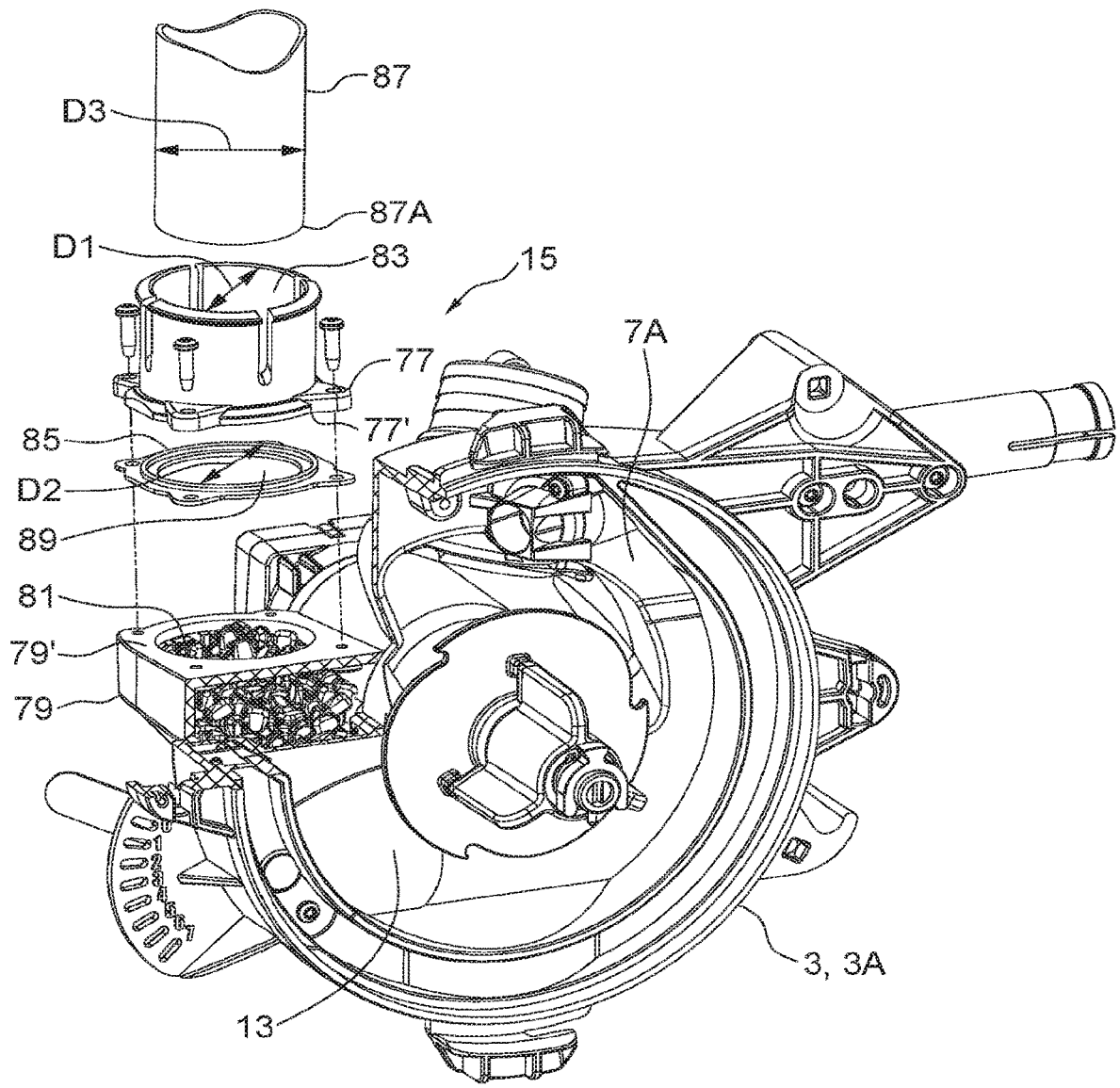
FIG. 23 is an exploded sectional perspective view of the seed fill port and fill conduit.

Pressurized air escaping out through the seed fill port 15 is wasted and so the seed fill port 15 is configured to resist the passage of pressurized air out of the seed housing area 7A located on the seed side of the seed disc in the seed housing portion 3A of the meter housing 3. As schematically illustrated in the sectional exploded view of FIG. 23, the seed fill port 15 comprises a conduit connector 77 with a connector face 77' releasably attached by fasteners to a corresponding reservoir face 79' of an opening element 79 formed on the outside of the seed area portion 3A of the meter housing 3. The conduit connector 77 defines a conduit aperture 83 and the opening element 79 defines a seed passage 81 leading to the seed reservoir 13.

A conduit gasket 85 is placed between the connector face 77' and the reservoir face 79' and seals the connector face 77' to the reservoir face 79'. The conduit gasket 85 also extends into the conduit aperture 83. A fill conduit 87 extends through the conduit aperture 83 and the conduit gasket 85 such that an outer wall of the fill conduit 87 is sealed to the conduit gasket 85, and such that an open outlet end of the fill conduit 87 is oriented to direct the seeds through the seed passage 81 into the seed reservoir 13.

The conduit aperture 83 is substantially circular and has a first diameter D1, and the conduit gasket 85 defines a substantially circular gasket aperture 89 with a second diameter D2 that is less than the first diameter D1. The outer wall of the fill conduit 87 is substantially cylindrical and has with a third diameter D3 that is less than the first diameter D1 and greater than the second diameter D2.

The fill conduit 87 extends through the conduit aperture 83 and the conduit gasket 85 such that the outer wall of the fill conduit 87 is sealed to the conduit gasket 85, and such that an open outlet end 87A of the fill conduit 87 is oriented to direct the seeds into the seed reservoir 13. The illustrated arrangement resists wasted air flow out of the seed housing area 7A.

Figure 24:
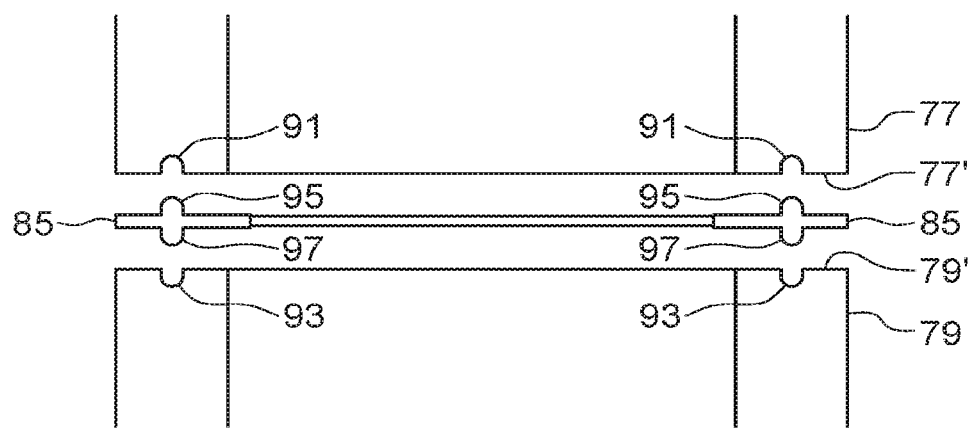
FIG. 24 is a schematic exploded sectional view of the connection between the conduit connector and the opening element using the conduit gasket.

For added sealing effect, FIG. 24 schematically illustrates the connector face 77' defining a circular first groove 91 and the reservoir face 79' defining a circular second groove 93. The conduit gasket 85 defines a circular first ridge 95 extending into the first groove 91 and a circular second ridge 97 extending into the second groove 93. The seed fill port 15 thus substantially prevents any pressurized air from leaking out of the seed housing portion 3A through the fill conduit connection.

The present disclosure further provides a method for aligning a singulator element 59, 60 on a seed disc 5, 5' of a singulating meter apparatus 1, where the singulating meter apparatus comprises a meter housing 3 comprising a seed housing portion 3A and vacant housing portion 3B. The method comprises mounting the singulator element 59, 60 in the seed housing portion 3A such that the singulator element 59, 60 is movable radially and axially; mounting an axial bias element 63 in the seed housing portion 3A operative to exert an axial bias force ABF on the singulator element in a direction outward from the seed housing portion 3A; mounting a radial bias element 61 in the seed housing portion 3A operative to exert a radial bias force RBF on the singulator element 59, 60 toward the disc rotational axis DRA; providing a circular disc shoulder 55 extending outward from a seed side 5A of the seed disc 5, 5' the disc shoulder 55 having a shoulder radius R2 less than a path radius R1 of a seed aperture path SAP; assembling the singulating meter apparatus 1 by engaging the seed disc 5, 5' on a driveshaft 65 of the seed housing portion 3A with the disc shoulder 55 facing the singulator element 59, 60; rotating the seed disc 5, 5' in the disc rotation direction DRD to exert an outward force OF on the singulator element 59, 60 against the radial bias force RBF such that the singulator element moves outward against the radial bias force RBF, while the axial bias element 63 exerts the axial bias force ABF on the singulator element 59, 60 toward the seed side 5A of the seed disc 5, 5' to a singulator operating position where an inner edge 59B, 60B of the singulator element 59, 60 bears against an outer face 55' of the disc shoulder 55.

The outward force OF is exerted by an alignment guide 57, 58 extending laterally outward from a guide location GL on the disc shoulder 55 and bearing against the singulator element 55 as the seed disc 5, 5' rotates in the disc rotation direction DRD.

The presently disclosed singulating meter apparatus 1 has a seed tube 19 with its inlet 21 located at about 12:00 o'clock on the rotating seed disc 5 and directs the seed air stream SAS horizontally such that the furrow opener at the outlet end of the seed tube 19 can be located some significant horizontal distance away from the meter without adding additional directional changes as would be required with a conventional singulating meter with a vertical drop at about 3:00 o'clock. Where there are directional changes in the seed tube, the seeds can contact tube walls which can adversely affect seed spacing.

Pressurized air requirements are significantly reduced as the exhaust air stream EAS passes through only about one half of the seed apertures 11 in the seed disc 5. The debris ejector 35 is also configured to push debris from the seed apertures 11 into the seed air stream SAS and out through the seed tube 19 instead of pushing the debris back into the seed reservoir 13 as in conventional pressurized singulating meters.

The alignment guides 57 ensure that the singulator element 59 moves outward to the desired operating position bearing against the disc shoulder 55 of the seed disc 5 and against the seed side 5A of the seed disc 5. The disclosed conduit gasket seals the conduit connector 77 to the opening element 79, and also seals the fill conduit 87 to the conduit connector 77 and the opening element 79 to prevent the escape of pressurized air. The magnetic attachment of the singulator element 59 to the axial bias element 63 allows the singulator element 59 to be easily removed and replaced while ensuring proper positioning.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A singulating apparatus comprising:
   a seed housing portion and a vacant housing portion releasably attached to each other to form a substantially sealed housing;
   a seed disc enclosed in the housing and rotatable in a substantially vertical plane, the seed disc having a seed side and an opposite vacant side, the seed disc dividing the housing into a seed housing area enclosed by the seed housing portion and a vacant housing area enclosed by the vacant housing portion;
   a disc drive operative to rotate the seed disc about a disc rotational axis in a disc rotation direction;
   a plurality of seed apertures defined through the seed disc, the seed apertures substantially equally spaced at a substantially equal distance from a rotational axis of the seed disc such that as the seed disc rotates the seed apertures move along a circular seed aperture path;
   a circular disc shoulder extending outward from the seed side of the seed disc, the disc shoulder having a shoulder radius less than a path radius of the seed aperture path;
   an alignment guide extending laterally outward from a guide location on the disc shoulder;
   a seed reservoir formed in a bottom portion of the seed housing area;
   a singulator element configured to remove excess seeds from the seed apertures as the seed disc rotates when the singulator element is in a singulator operating position with an inner edge of the singulator element bearing against an outer face of the disc shoulder and an outer edge of the singulator element outside the seed aperture path;
   an axial bias element mounted to an interior of the seed housing portion and a radial bias element mounted to an interior of the seed housing portion;
   wherein the singulating element is attached to the axial bias element such that the axial bias element exerts an axial bias force on the singulator element toward the seed side of the seed disc; and
   wherein the radial bias element exerts a radial bias force on the singulator element toward the disc rotational axis;
   wherein when the seed disc begins to rotate in the disc rotation direction, the singulator element bears against the alignment guide and the singulator element moves outward along the alignment guide against the radial bias force to the singulator operating position.

2. The apparatus of claim 1 wherein the alignment guide comprises a ramp member and wherein an outer face of the ramp member coincides with the outer face of the disc shoulder at the guide location, and wherein the ramp member extends along the seed side of the seed disc in the disc rotational direction and curves toward the disc rotational axis from an outer end of the ramp member at the guide location to an inner end of the ramp member.

3. The apparatus of claim 2 comprising a plurality of ramp members, each ramp member extending outward from one of a like plurality of guide locations equally spaced along the disc shoulder.

4. The apparatus of claim 1 wherein the alignment guide comprises a guide bar and wherein an outer surface of the guide bar coincides with the outer face of the disc shoulder at the guide location, and wherein the singulator element comprises a ramp surface sloping outward from the inner edge of the singulator element in a direction opposite to the disc rotation direction.

5. The apparatus of claim 4 comprising a plurality of guide bars, each guide bar extending outward from one of a like plurality of guide locations equally spaced along the disc shoulder.

6. The apparatus of claim 1 wherein the singulating element is releasably attached to the axial bias element by magnetic attraction.

7. The apparatus of claim 6 wherein the magnetic attraction is provided by a first magnet fixed to the axial bias element, and a second magnet fixed to the singulator element.

8. The apparatus of claim 7 wherein the first magnet is mounted in a magnet case and where the magnet case and singulator element comprise interlocking protrusions and corresponding recesses configured to maintain the magnet case in a desired position with respect to the singulator element.

9. A method for aligning a singulator element on a seed disc of a singulating meter, where the singulating meter comprises a meter housing comprising a seed housing portion and vacant housing portion, the method comprising:
   mounting the singulator element in the seed housing portion such that the singulator element is movable radially and axially;
   mounting an axial bias element in the seed housing portion operative to exert an axial bias force on the singulator element in a direction outward from the seed housing portion;
   mounting a radial bias element in the seed housing portion operative to exert a radial bias force on the singulator element toward the disc rotational axis;
   providing a circular disc shoulder extending outward from a seed side of the seed disc, the disc shoulder having a shoulder radius less than a path radius of a seed aperture path;
   assembling the singulating meter by engaging the seed disc on a driveshaft of the seed housing portion with the disc shoulder facing the singulator element;
   rotating the seed disc in the disc rotation direction to exert an outward force on the singulator element against the radial bias force such that the singulator element moves outward against the radial bias force, while the axial bias element exerts the axial bias force on the singulator element toward the seed side of the seed disc, to a singulator operating position where an inner edge of the singulator element bears against an outer face of the disc shoulder.

10. The method of claim 9 wherein the outward force is exerted by an alignment guide extending laterally outward from a guide location on the disc shoulder and bearing against the singulator element as the seed disc rotates in the disc rotation direction.

11. The method of claim 10 wherein the alignment guide comprises a ramp member and wherein an outer face of the ramp member coincides with the outer face of the disc shoulder at the guide location, and wherein the ramp member extends along the seed side of the seed disc in the disc rotational direction and curves toward the disc rotational axis from an outer end of the ramp member at the guide location to an inner end of the ramp member, and wherein the inner edge of the singulator element bears against the ramp member when the seed disc rotates in the disc rotation direction.

12. The method of claim 10 wherein the alignment guide comprises a guide bar and wherein an outer surface of the guide bar coincides with the outer face of the disc shoulder at the guide location, and wherein the singulator element comprises a ramp surface sloping outward from the inner edge of the singulator element in a direction opposite to the disc rotation direction, and wherein the ramp surface bears against the guide bar when the seed disc rotates in the disc rotation direction.

13. The method of claim 10 comprising providing a plurality of alignment guides, each alignment guide extending outward from one of a like plurality of guide locations equally spaced along the disc shoulder.

14. The method of claim 10 comprising magnetically attaching the singulator element to the axial bias element.

15. A singulating apparatus comprising:
   a seed housing portion and a vacant housing portion releasably attached to each other to form a substantially sealed housing;
   a seed disc enclosed in the housing and rotatable in a substantially vertical plane, the seed disc having a seed side and an opposite vacant side, the seed disc dividing the housing into a seed housing area enclosed by the seed housing portion and a vacant housing area enclosed by the vacant housing portion;
   a disc drive operative to rotate the seed disc about a disc rotational axis in a disc rotation direction;
   a plurality of seed apertures defined through the seed disc, the seed apertures substantially equally spaced at a substantially equal distance from a rotational axis of the seed disc such that as the seed disc rotates the seed apertures move along a circular seed aperture path;
   a seed reservoir formed in a bottom portion of the seed housing area;
   a singulator element configured to remove excess seeds from the seed apertures as the seed disc rotates when the singulator element is in a singulator operating position;
   an axial bias element mounted to an interior of the seed housing portion and a radial bias element mounted to an interior of the seed housing portion;
   wherein the singulating element is magnetically attached to the axial bias element such that the axial bias element exerts an axial bias force on the singulator element toward the seed side of the seed disc; and
   wherein the radial bias element exerts a radial bias force on the singulator element toward the disc rotational axis.

\* \* \* \* \*